United States Patent [19]

Miyauchi

[11] Patent Number: 4,670,479

[45] Date of Patent: Jun. 2, 1987

[54] POLYCARBONATE RESIN COMPOSITION USEFUL IN OPTICAL APPLICATIONS

[75] Inventor: Masayoshi Miyauchi, Matsuyama, Japan

[73] Assignee: Teijin Chemicals, Ltd., Tokyo, Japan

[21] Appl. No.: 891,887

[22] Filed: Aug. 1, 1986

[30] Foreign Application Priority Data

Aug. 2, 1985 [JP] Japan .................. 60-169880

[51] Int. Cl.[4] .............................................. C08K 5/50
[52] U.S. Cl. ................................... 524/154; 524/315; 524/318
[58] Field of Search ................ 524/154, 318, 315

[56] References Cited

U.S. PATENT DOCUMENTS

| | | | |
|---|---|---|---|
| 3,186,961 | 6/1965 | Sears | 524/298 |
| 3,836,499 | 9/1974 | Schirmer et al. | 524/318 |
| 4,092,288 | 5/1978 | Calkins et al. | 524/154 |
| 4,131,575 | 12/1978 | Adelmann et al. | 260/17.4 |
| 4,367,303 | 1/1983 | Eimers et al. | 524/154 |

FOREIGN PATENT DOCUMENTS

| | | |
|---|---|---|
| 01-43906 | 7/1983 | European Pat. Off. |
| 0103107 | 3/1984 | European Pat. Off. |
| 47-22088 | 6/1972 | Japan |
| 72-41092 | 10/1972 | Japan |
| 48-90350 | 11/1973 | Japan |
| 1350338 | 4/1974 | United Kingdom |

*Primary Examiner*—Veronica P. Hoke
*Attorney, Agent, or Firm*—Sherman and Shalloway

[57] ABSTRACT

A polycarbonate resin composition comprising a blended mixture of (A) a polycarbonate resin having a viscosity average molecular weight of from about 13,000 to about 18,000, (B) 0.0001 to less than 0.02% by weight, based on the weight of the resin (A), of an organic phosphine, and (C) 0 to 0.5% by weight, based on the weight of the resin (A), of a partial ester of a monobasic fatty acid having 10 to 22 carbon atoms with a polyhydric alcohol having 2 to 10 carbon atoms, the amount of the partial ester (C) being 0.01 to 0.5% by weight when the amount of the organic phosphine (B) is not less than 0.005% by weight, and said composition containing less than 0.004%, based on the weight of the resin (A), of chlorine.

8 Claims, No Drawings

POLYCARBONATE RESIN COMPOSITION USEFUL IN OPTICAL APPLICATIONS

This invention relates to a polycarbonate resin composition having a low chlorine content, and specifically, to a polycarbonate resin composition having various excellent properties such as excellent flowability, thermal stability, moldability and hydrolysis resistance and pinhole formation resistance on a thin coated layer on the surface of a molded article prepared from the resin composition. The polycarbonate resin composition of this invention is useful in many applications, especially in optical applications.

More specifically, this invention relates to a polycarbonate resin composition comprising a blended mixture of
(A) a polycarbonate resin having a viscosity average molecular weight of from about 13,000 to about 18,000,
(B) 0.0001 to less than 0.02% by weight, based on the weight of the resin (A), of an organic phosphine, and
(C) 0 to 0.5% by weight, based on the weight of the resin (A), of a partial ester of a monobasic fatty acid having 10 to 22 carbon atoms with a polyhydric alcohol having 2 to 10 carbon atoms,
the amount of the partial ester (C) being 0.01 to 0.5% by weight when the amount of the organic phosphine (B) is not less than 0.005% by weight, and said composition containing less than 0.004%, based on the weight of the resin (A), of chlorine.

Polycarbonate resins have been used in a wide range of applications, and recently attracted attention as resins which give substrates for information recording articles such as digital signal recording discs and optical video discs, optical articles such as lenses, prisms and Fresnel lenses and excellent molded articles for use in other optical applications.

In such optical uses, one important property required of the polycarbonate resin is that a molded article of the polycarbonate resin has a reduced optical distortion (retardation). Generally, such a resin article is essentially required to have a birefringence of not more than 100 nm. To obtain such low-birefringence molded articles, it is the usual practice to use a polycarbonate resin having a viscosity average molecular weight of not more than about 20,000. Since the molding temperature for such a polycarbonate resin reaches about 300 to about 400° C., it is desired to use a polycarbonate resin composition having high thermal stability and excellent mold releasability.

In optical applications, for example as a substrate for information recording devices, it is frequently the practice to provide a thin coated layer of a metal or a metal compound or a thin coated layer containing a dye on the surface of the substrate. Furthermore, in using the polycarbonate resin as a lens, a thin coated layer of a metal, a metal compound, an organosiloxane-type paint or a melamine-type paint is frequently applied to the lens surface for prevention of scratching, or for antihaze and antiglare purposes. In such optical applications, it is desired to use a polycarbonate resin composition having excellent hydrolysis resistance, excellent resistance to pinhole formation on the thin coated layer, and therefore a satisfactory life or durability.

Generally, polycarbonate resins contain at least 40 ppm, for example 40 to 100 ppm, as chlorine, of chlorine-containing compounds used in their production such as methylene chloride as a solvent or compounds having an unreacted chloroformate group. These chlorine-containing compounds decompose to generate acidic substances when the resins are molded at high temperatures of, for example, 300° C. or higher. The acidic substances will corrode molds. When a thin film of a metal or a metallic compound, a thin film containing a dye, or another type of thin film is provided on the surfaces of the molded products, these acidic substances will also cause degeneration of the thin films or the dye.

It is desired therefore to use a polycarbonate resin of a low chlorine content which is highly purified to remove the chlorine-containing compounds that cause these troubles. Thorough removal of chlorine-containing compounds, however, is restricted both in operation and cost. Even with a polycarbonate resin of a low chlorine content of less than 0.004% by weight, it has previously been impossible to avoid burn marks or coloration in molding at a temperature of, for example, 350° C. or higher. Addition of a phosphite ester most widely used as a heat stabilizer for conventional general polycarbonates can obviate burn marks or coloration, but when the resulting molded product is exposed to a high-temperature high-humidity atmosphere for an extended period of time, the average molecular weight of the polycarbonate decreases. Furthermore, when the aforesaid thin film is to be applied to the surface of the molded product as in optical applications, the phosphite ester heat stabilizer inevitably affects the thin films adversely.

Accordingly, in using a low chlorine polycarbonate resin, particularly in optical applications, a molding composition of the resin is desired to have excellent thermal stability, moldability, and pinhole formation resistance on a thin coated layer on the surface of a molded article prepared from the resin composition.

It is extremely difficult, however, to provide a polycarbonate resin composition having excellent properties that meet the aforesaid various requirements, and it has been desired to develop such a composition.

Some proposals have previously been made for the use of an organic phosphine corresponding to the component (B) of the composition of this invention as a heat stabilizer for polycarbonate resins.

For example, Japanese Patent Publication No. 22088/1972 (published on June 21, 1972) discloses heat-resistant resin composition prepared by adding an organic phosphine compound represented by the following formula

wherein $R_1$, $R_2$ and $R_3$ each represent hydrogen, alkyl, cycloalkyl, alkenyl, phenyl or aralkyl, which may be sustituted by alkyl, or alkoxy or amino, or to a polycarbonate resin or polyphenylene oxide resin in order to increase the thermal stability of synthetic resins having high processing temperatures including polycarbonate resins.

This patent document states that the amount of the organic phosphine used is preferably 0.01 to 10%, especially 0.1 to 2%, and in Example 1 which is the sole example of incorporating the phosphine into a polycarbonate resin, the phosphine is used in an amount of about 0.5% by weight. The patent document, however, does not at all refer to the component (C) of the composition of this invention, and naturally neither describes nor suggests that when the amount of the phosphine is in the range of not less than 0.005% by weight which range includes the lower limit 0.01% described in this patent document, the phosphine (component B) must be used in combination with the component (C) in this invention. This patent document totally fails to suggest the aforesaid technical problems and the technical idea and means for solving these problems which are described hereinabove with regard to the low chlorine polycarbonate resin or composition specified in the present invention. The composition of this patent document does not satisfy the quantitative relationship between the components (B) and (C) set forth hereinabove and in the claims. As will be shown later in Comparative Example 4, when the component (B) alone is used in an amount of 0.5% by weight, a number of pinholes occur upon wet heat treatment in an aluminum film vacuum deposited on a molded circular plate obtained from the resulting composition. Furthermore, as shown in Comparative Example 3, when the component (B) alone is used in an amount of 0.01% by weight, pinholes, although small in number, occur in an aluminum film vacuum deposited on a molded circular plate obtained from the resulting composition.

As another proposal, British Patent No. 1,350,338 published on Apr. 18, 1974 (corresponding to West German OLS No. 2,206,720 and Japanese Laid-Open Patent Publication No. 90350/1973) describes a thermally stable aromatic polycarbonate composition comprising an aromatic polycarbonate resin having in admixture therewith from 0.005 to 0.5 weight percent, based on the weight of the polycarbonate, of a phosphine of the formula $PR_3$ where each R is an alkyl, aryl or alkaryl radical. This patent describes that the amount of the phosphine used is in the range of 0.005 to 0.5 weight percent, but the amounts of it used specifically in working examples are in the range of 0.02 to 0.1%. This patent neither refers to the component (C) of the composition of this invention. Naturally, therefore, the patent does not describe nor suggest that in the quantitative range of not less than 0.005% by weight which range includes the amounts in the examples of the patent and the aforesaid lower limit 0.005% by weight, the components (B) and (C) should be used in combination. In addition, this patent totally fails to suggest the aforesaid technical problems and the technical idea and means for solving these problems which are described hereinabove with regard to the low chlorine polycarbonate resin or composition specified in the present invention. Furthermore, it should be pointed out that Comparative Examples 3 and 4 given hereinbelow show that when the component (B) is used in an amount of not less than 0.005% by weight, a satisfactory improvement cannot be achieved unless it is used in combination with the component (C).

As still another proposal, Japanese Laid-Open Patent Publication No. 90254/1985 (laid-open on May 21, 1985) discloses a process for the production of polycarbonate shaped articles of a thermoplastic polycarbonate composition by a devolatilizing injection-molding process or a devolatilizing extrusion process, wherein the composition contains a phosphane of the general formula $(R)_2PR^1$ in which R is an unsubstituted or substituted $C_6-C_{14}$ aryl radical and $R^1$ is an unsubstituted or substituted $C_1-C_{18}$ alkyl radical. This patent document states that the amount of the phosphane used is 0.01 to 1% by weight, preferably 0.02 to 0.5% by weight, especially 0.05 to 0.2% by weight, based on the total weight of the polycarbonate and phosphane. This patent document totally fails to refer to the component (C) of the composition of this invention. Naturally, therefore, it neither describes nor suggests that when the amount of the phosphane is in the range of not less than 0.005% by weight which range includes the lower limit 0.01% described in this patent document, the component (B) should be used in combination with the component (C). In addition, this patent document totally fails to suggest the aforesaid technical problems and the technical idea and means for solving these problems which are described hereinabove with regard to the low chlorine polycarbonate resin or composition specified in the present invention. Furthermore, the composition of this patent document does not satisfy the quantitative relationship between the components (B) and (C) set forth hereinabove and in the claims.

Other proposals have been known which utilize an ester or partial ester that can overlap the component (C) of the composition of this invention as a lubricant for improving the releasability of a molded article of a polycarbonate resin from a mold.

Japanese Patent Publication No. 41092/1972 (published on Oct. 17, 1972), for example, discloses a polycarbonate resin composition comprising a polycarbonate resin and as a lubricant for improving the releasability of a molded product from a mold, 0.05 to 5% by weight, preferably 0.1 to 0.5% by weight, of an ester or partial ester of a monobasic saturated aliphatic carboxylic acid having 12 to 30 carbon atoms with a monohydric saturated aliphatic alcohol or a polyhydric alcohol. The lubricant in this patent document includes partial esters which can overlap component (C) of the composition of the present invention. This patent document, however, totally fails to describe or suggest the organic phosphine (B) which is an essential component in the composition of this invention. Naturally, therefore, it neither describes nor sugggest the quantitative relationship beteeen the components (B) and (C) specified hereinabove and in the claims nor the combination of (A), (B) and (C) in the composition of this invention. This patent document fails to describe the utilization of the polycarbonate resin composition in optical applications, the technical problems in such applications and an idea of solving such problems. Furthermore, this patent document illustrates only the use of polycarbonate resins having a molecular weight exceeding about 20,000, for example 24,000 and 25,000.

Japanese Laid-Open Patent Publication No. 81245/1985 (laid open on May 9, 1985) discloses a polycarbonate resin composition comprising a polycarbonate resin having a viscosity average molecular weight of 15,000 to 35,000 and containing 15 to 150 ppm, calculated as chlorine atoms, of a chlorine compound such as methylene chloride and 0.001 to 0.5% by weight, preferably 0.03 to 0.1% by weight, of a partial ester, preferably a monoester, of a monobasic saturated aliphatic carboxylic acid having preferably 10 to 24, more preferably 12 to 20, carbon atoms, with a polyhydric alcohol in order to prevent the corrosion of a mold which adversely affects the appearance of a molded article prepared from it, the releasability of the molded article from the mold, the dimensional accuracy of the molded article, and the life of the mold, etc. The partial ester in this patent document can overlap the component (C) in the composition of this invention. However, this patent document totally fails to refer to the essential organic phosphine component (B) of the composition of this invention. Naturally, therefore, it neither describes nor suggests the quantitative relationship between the components (B) and (C) specified hereinabove and in the claims nor the combination of (A), (B) and (C) in the composition of this invention. Furthermore, it does not touch upon the utilization of the composition in optical applications, the technical problems in such utility, and an idea of solving these problems.

The present inventor has made investigations in order to provide a polycarbonate resin composition which generates a chlorine-containing acidic substance to such an extent as to give rise to no substantial problem, and even in a high-temperature high-humidity atmosphere, does not adversely affect a thin film of a metal or a metallic compound or another thin film to be adhered to the surface of a molded article of the composition.

It has consequently been found that the components (B) and (C) satisfying the following combination parameters exhibit superb improving effects in overcoming the various troubles mentioned above, particularly those in optical applications, which occur even when one selects a low chlorine polycarbonate resin having a chlorine content of less than 0.004% by weight and a viscosity average molecular weight of from about 13,000 to about 18,000.

(B) 0.0001 to less than 0.02% by weight, based on the weight of the resin (A), of an organic phosphine, and (C) 0 to 0.5% by weight, based on the weight of the resin (A), of a partial ester of a monobasic fatty acid having 10 to 22 carbon atoms with a polyhydric alcohol having 2 to 10 carbon atoms.

In the above components (B) and (C), when the amount of the organic phosphine (B) is not less than 0.005% by weight, the amount of the partial ester (C) is 0.01 to 0.5% by weight.

It is an object of this invention therefore to provide a polycarbonate resin composition having various improved properties which is especially useful in optical applications.

The above and other objects of this invention along with its advantages will become apparent from the following description.

The polycarbonate resin (A) in the composition of this invention and the method of its production are known. Commercially available polycarbonate resins can also be used in this invention.

The polycarbonate resin component (A) may be produced by techniques known per se by reacting dihydric phenols with carbonate-precursors such as phosgene and diphenyl carbonate. Examples of the dihydric phenols are hydroquinone, dihydroxydiphenyl, bis(hydroxyphenyl)alkanes, bis(hydroxyphenyl)cycloalkanes, bis(hydroxyphenyl)ethers, bis(hydroxyphenyl)ketones, bis(hydroxyphenyl)sulfides, bis(hydroxyphenyl)sulfones and brominated or lower alkylated products thereof. A polycarbonate resin derived from a bis(hydroxyphenyl)alkane and a carbonate precursor is preferred. The bis(hydroxyphenyl)alkane may, for example, be at least one member selected from the group consisting of 2,2-bis(4-hydroxyphenyl)-propane (bisphenol A), 1,1-bis(4-hydroxyphenyl)ethane and 2,2-bis(4-hydroxyphenyl)hexafluoropropane. The dihydric phenols may be used singly or in combination. Polycarbonate resins obtained by copolymerizing a small amount of an aromatic dicarboxylic acid further as a comonomer, and polycarbonate resins having a branched structure can also be used. The polycarbonates may be used singly or in combination.

In the present invention, the polycarbonate resin (A) has a viscosity average molecular weight (M) of from about 13,000 to about 18,000. If the molecular weight (M) is lower than the lower limit specified, the strength of a molded article from the polycarbonate resin is unsatisfactory for practical applications. If it is higher than the specified upper limit, molding strains tend to occur during molding, and the molded articles become unsuitable for optical applications because they undergo degradation in regard to optical distortion, color, and transparency. Accordingly, in the present invention, the polycarbonate resin (A) used should have viscosity average molecular weight (M) of from about 13,000 to about 18,000.

The viscosity average molecular weight M of the polycarbonate resin (A) used in this invention is obtained by measuring the specific viscosity $\eta_{sp}$ of a solution of 0.7 g (=C) of the resin in 100 ml of methylene chloride at 20° C. by an Ostwald's viscometer, calculating the intrinsic viscosity $[\eta]$ of the resin in accordance with the equation $\eta_{sp}/C = [\eta] + 0.45\,[\eta]^2 C$, and substituting the resulting intrinsic viscosity $[\eta]$ for $[\eta]$ in the following equation (1).

$$[\eta] = 1.23 \times 10^{-4} M^{-0.83} \qquad (1)$$

Polycarbonate resins contain methylene chloride, a chloroformate of a dihydric phenol, or an oligomer or polymer having a terminal chloroformate group, and the overall content of these chlorine-containing compounds is expressed by the content of chlorine. Advantageously, the polycarbonate resin used in this invention has a chlorine content of less than 0.004% by weight, preferably less than 0.003% by weight, more preferably less than 0.002% by weight. If, however, the chlorine content of the polycarbonate can be reduced to less than 0.004% by weight during preparation of the composition of this invention, the starting polycarbonate may have a higher chlorine content.

The polycarbonate resin composition of this invention contains the organic phosphine (B) in an amount of 0.0001 to less than 0.02% by weight, preferably 0.0005 to less than 0.01% by weight, based on the weight of the polycarbonate resin (A).

If the amount of the component (B) is 0.02% by weight or more, its heat stabilizing effect can be fully observed during molding of the resulting composition. However, when an aluminum film is vacuum-deposited on part of the surface of a molded article prepared from the resulting composition and the molded article is exposed for an extended period of time to a high-temperature high-humidity atmosphere, pinholes may occur in the aluminum film, and the aluminum film loses gloss or undergoes degradation. Hence, such an excessive amount is not suitable for the purposes of this invention. On the other hand, it has been ascertained that even if the organic phosphine (B) is used alone in an amount of less than 0.005% by weight, its heat stabilizing effect during molding is fully achieved and pinhole formation and degeneration hardly occur in a thin coated layer on the surface of a molded article prepared from the composition. However, if the amount of the component (B) is less than 0.0001% by weight, the heat-stabilizing effect is difficult to achieve.

When the amount of the organic phosphine (B) is in a range in which it can be used alone, namely less than 0.005% by weight, it is preferred to choose the resin (A) or the method of preparing the composition so that the final resin composition has a chlorine content of less than 0.003% by weight, preferably less than 0.002% by weight. Of course, even in this case, the partial ester (C) may be used in combination in an amount of up to 0.5% by weight, preferably up to 0.1% by weight, for example, 0.01 to 0.5% by weight, preferably 0.01 to 0.1% by weight. In the case of using the components (B) and (C) in combination, no particular consideration is necessary to the selection of the chlorine content of the resin (A) so long as the final resin composition has a chlorine content of less than 0.004% by weight.

When the amount of the organic phosphine (B) is not less than 0.005% by weight, preferably more than 0.0045% by weight to less than 0.02% by weight, the partial ester (C) must be used in combination in an amount of 0.01 to 0.5% by weight, preferably 0.01 to 0.1% by weight. If the partial ester (C) is not jointly used in this case, pinholes, although small in number, occur upon wet heat treatment in an aluminum film vacuum-deposited on a molded circular plate of the composition (see Comparative Example 3). Furthermore, if in this embodiment of conjoint use, the amount of the partial ester (C) is too small outside the above-specified range, fine spot-like degeneration (frosting) occurs upon wet heat treatment on an aluminum film vacuum-deposited on a molded circular plate of the composition. If it is too large beyond the specified range, silver streaks will be formed, or discoloration will occur, during the molding of a circular plate.

Examples of the organic phosphine (B) used in this invention are secondary or tertiary phosphines represented by the following formula

wherein $R^1$, $R^2$ and $R^3$, independently from each other, represent a $C_1$-$C_{20}$ alkyl, $C_3$-$C_6$ cycloalkyl or $C_2$-$C_6$ alkenyl group which may have a substituent such as hydroxy, acetoxy, lower alkylcarboxy, phenyl, or lower alkoxyphenyl, or a phenyl or naphthyl group which may have a substituent such as hydroxy or $C_1$-$C_{10}$ alkyl, and one of $R^1$, $R^2$ and $R^3$ may represent a hydrogen atom.

Specific examples of the organic phosphine (B) include
triethylphosphine,
triisopropylphosphine,
tri-n-butylphosphine,
tricyclohexylphosphine,
allyldiphenylphosphine,
triphenylphosphine,
diphenylphosphine,
tri-2,4-dimethylphenylphosphine,
tri-2,4,6-trimethylphenylphosphine,
tri-o-tolylphosphine,
tri-o-anisylphosphine,
diphenylbutylphosphine,
diphenyl-octadecylphosphine,
tris-(p-nonylphenyl)-phosphine,
tris-naphthylphosphine,
diphenyl-(hydroxymethyl)-phosphine,
diphenyl-acetoxymethylphosphine,
diphenyl-(beta-ethylcarboxyethyl)phosphine,
diphenyl-benzylphosphine,
diphenyl-(p-hydroxyphenyl)-phosphine,
diphenyl-1,4-dihydroxyphenyl-2-phosphine, and
phenyl-naphthyl-benzylphosphine.

The partial fatty acid ester (C) used in the composition of this invention is a partial ester of a monobasic fatty acid having 10 to 22 carbon atoms with a polyhydric alcohol having 2 to 10 carbon atoms. The partial ester can be produced by esterifying the monobasic fatty acid with the polyhydric alcohol by techniques known per se, and is also available commercially. Such commercially available partial esters can also be used in this invention. The partial esters may be used singly or in combination, and are also available in such forms on the market.

Examples of the partial fatty acid ester (C) are partial esters formed between at least one monobasic fatty acid having 10 to 22 carbon atoms selected from the group consisting of myristic acid, palmitic acid, stearic acid, oleic acid and fatty acids of hardened fish oils and at least one polyhydric alcohol having 2 to 10 carbon atoms selected from the group consisting of ethylene glycol, glycerin and pentaerythritol. Preferred among these partial esters are those formed between glycerol and at least one fatty acid having 18 to 22 carbon atoms such as stearic acid, oleic acid and fatty acids (e.g., $C_{18}$-$C_{22}$) of hardened fish oils. Glyceryl monostearate is most preferred.

The polycarbonate resin composition of this invention may contain additives in addition to the components (A), (B) and (C). Examples of the additives are 0.01 to 0.5% by weight, based on the weight of the polycarbonate resin (A), of a mold releasing agent other than compounds falling within the component (C) of the composition of this invention, such as paraffins, montan wax, stearyl palmitate, palmityl stearate, di-2-ethylhexyl adipate, beeswax, and silicone oils, and 0.1 to 0.7% by weight, based on the weight of the polycarbonate resin (A), of an ultraviolet absorber such as 2-hydroxy-4-n-octoxybenzophenone, 2-(2'-hydroxy-5'-methylphenyl)benzotriazole, 2-(2'-hydroxy-3'-t-butyl-5'-methylphenyl)-5-chloro-benzotriazole, 2-(2H-benzotriazol-2-yl)-4-(1,1,3,3-tetramethylbutyl)phenol.

The composition of this invention can be easily prepared by mixing the essential components (A) and (B), or (A), (B) and (C), and if required, the other additives to form a blended mixture.

The mixing may be carried out by any known methods, and the sequence of mixing the components is optional. For example, a powder or pellets of the polycarbonate resin (A) and the organic phosphine (B), with or without the partial ester (C), and as required, the other additives may simply be mixed by using a tumbler, a V-type blender, a supermixer, etc. Alternatively, the composition of this invention may be easily prepared by mixing a solution of the polycarbonate resin (A) with the organic phosphine (B), with or without the partial ester (C) and further the other additives, and then removing the solvent. It can also be prepared by continuously introducing a powder or pellets of the polycarbonate resin (A) and the organic phosphine (B) with or without the partial ester (C) and the other additives into an extruder. When a mixing method such as melt-extrusion is employed, it is anticipated that the organic phosphine will be changed to another phosphorus compound. It should be understood that this case also falls within the scope of this invention.

The resulting composition of this invention should have a chlorine content of less than 0.004% by weight, preferably less than 0.003% by weight, more preferably less than 0.002% by weight, based on the weight of the polycarbonate resin (A). When the starting polycarbonate resin (A) has a chlorine content of less than 0.004% by weight, the composition may be prepared by mechanically mixing all the required components. But if the polycarbonate resin (A) has a chlorine content of 0.004% by weight or more, it is recommended to melt-mix all the required components in a vent-equipped extruder. The chlorine content of the resin composition can be determined by hydrolyzing the sample with an aqueous solution of sodium hydroxide and then quantitatively analyzing the hydrolyzed sample by the Volhard method.

The composition of this invention in the form of a melt-molded article for optical applications may be produced by injection molding, compression molding or injection-compression molding. Especially preferred conditions for injection molding are a resin temperature of 320° to 380° C. and a mold temperature of 70° to 120° C.

The composition of this invention in the form of a molded article for optical applications is very transparent with a light transmittance of about 90% and has a very small optical distortion typified by its birefringence. Furthermore, even when various thin films as described hereinabove are applied to the molded article, they do not undergo degeneration. Accordingly, it has excellent utility as a substrate for various information recording discs, and various lenses, prisms and Fresnel lenses.

The following Examples and Comparative Examples illustrate the present invention. The birefringence and transmittance of a molded circular plate and the appearance of a molded circular plate having a vacuum-deposited coating in these examples were measured and determined by the following methods.

Mesurement of birefringence

Resin pellets were injection-molded into a circular plate having a thickness of 1.2 mm and a diameter of 120 mm by a 3-ounce injection molding machine (Neomat 150/75 type, made by Sumitomo Heavy Machinery Industry Co., Ltd.) at a resin temperature of 350° C. and a mold temperature of 110° C. The birefringence of the plate was measured at a position 30 mm away from the center of the plate toward its peripheral portion by using a polarization analysis device (Ellipsometer) made by Mizoshiri Kogaku Kogyosho Co., Ltd., and expressed in nm.

Measurement of transmittance

The transmittance of the molded circular plate above was measured by a Hitachi self-recording spectrophotometer (model U-3400) at a wavelength in the range of 500 to 1000 nm, and expressed in %.

Evaluation of a molded article having a vacuum-deposited coating

The molded circular plate mentioned above was put into a bell jar of a vacuum depositing device, and aluminum was vapor-deposited only on one surface of the plate at $10^{-5}$ torr. A polyurethane resin was coated on the plate, and the plate was left to stand for 72 hours in a constant-temperature constant-humidity machine in an atmosphere kept at a relative humidity of 95% and a temperature of 85° C. Then, the number of pinholes formed in the aluminum film was counted. Pinholes are undesirable since they prevent accurate recording of information.

The polycarbonate resins used in the following examples were synthesized from 2,2-bis(4-hydroxyphenyl)-propane and phosgene.

EXAMPLES 1-6, 8 AND 11

In each run, a polycarbonate resin powder having an average molecular weight of 14,900 was mixed with the organic phosphine (B) and the partial ester (C) in the proportions indicated in Table 1. The mixture was extruded at 260° C. by using a 30 mm vent-equipped extruder. The extruded thread was cut by a cutter to obtain pellets. The viscosity average molecular weight and chlorine content of the pellets were as shown in Table 1.

The pellets were injection-molded into a circular plate having a thickness of 1.2 mm and a diameter of 120 mm by a 3-ounce injection molding machine at a resin temperature of 350° C. and a mold temperature of 110° C.

An aluminum film was vacuum-deposited on the molded circular plate, and a polyurethane resin was coated on the plate. The coated plate was subjected to wet heat treatment, and a change in appearance was evaluated by the number of pinholes that occurred. The results are shown in Table 1.

EXAMPLE 7

Example 2 was repeated except that a polycarbonate resin powder having an average molecular weight of 17,100 was used instead of the polycarbonate resin powder used in Example 2. The results are shown in Table 1.

EXAMPLES 8-9

Example 7 was repeated except that the polycarbonate resin powder having an average molecular weight of 17,100 was mixed with the organic phosphine (B) and the partial ester (C) in the proportions indicated in Table 1. The results are shown in Table 1.

COMPARATIVE EXAMPLE 1

Example 1 was repeated except that the organic phosphine (B) and the partial ester (C) were not added. The results are shown in Table 1. The molded circular plate assumed a yellow color and was found to be unsuitable for optical applications.

COMPARATIVE EXAMPLES 2, 3, 5 AND 8

Example 1 or 7 was repeated except that the amounts of the organic phosphine (B) and the partial ester (C) were outside the ranges defined by the quantitative relationship set forth in the claims. The results are shown in Table 1. The molded circular plates showed satisfactory properties, but upon wet heat treatment, some pinholes occurred in the vacuum-deposited aluminum film.

COMPARATIVE EXAMPLES 4 AND 6

Example 1 was repeated except that the partial ester (C) was not added, and the amount of the organic phosphine (B) exceeded the range specified in the claims. The results are shown in Table 1. The molded circular plates were satisfactory, but upon wet heat-treatment, many pinholes occurred in the aluminum film.

COMPARATIVE EXAMPLE 7

Example 2 was repeated except that the vent of the extruder was not operated. The results are shown in Table 1. The molded circular plate slightly lacked transparency, and upon wet heat-treatment, a number of pinholes occurred in the aluminum film.

COMPARATIVE EXAMPLE 9

Example 2 was repeated except that triphenyl phosphite (organic phosphite) was used instead of the organic phosphine (B). The results are shown in Table 1. The molded circular plate showed satisfactory properties, but upon wet heat-treatment, pinholes occurred in the aluminum film.

3. The composition of claim 2 wherein the bis(hydroxyphenyl)alkane is at least one member selected from the group consisting of 2,2-bis(4-hydroxyphenyl)-propane, 1,1-bis(4-hydroxyphenyl)ethane and 2,2-bis(4-hydroxyphenyl)hexafluoropropane.

4. The composition of claim 2 wherein the carbonate precursor is at least one member selected from the group consisting of phosgene and diphenyl carbonate.

5. The composition of claim 1 wherein the organic phosphine (B) is a secondary or tertiary phosphine represented by the following formula

TABLE 1

| Example (Ex.) or Comparative Example (CEx.) | (A) Polycarbonate resin Viscosity average molecular weight | (B) Organic phosphine Name* | (B) Organic phosphine Amounts (wt. %) | (C) Partial ester** Amounts (wt. %) | Resin composition Viscosity average molecular weight | Resin composition Chlorine content (wt. %) | Circular plate Transmittance (%) | Circular plate Birefringence (nm) | Number of pinholes of the circular vacuum deposited coating Before treatment | Number of pinholes of the circular vacuum deposited coating After treatment |
|---|---|---|---|---|---|---|---|---|---|---|
| Ex. 1 | 14,900 | a | 0.0020 | — | 14,800 | 0.0014 | 90 | 10 | 0 | 0 |
| Ex. 2 | " | a | 0.0045 | — | " | 0.0013 | 91 | 8 | 0 | 0 |
| CEx. 1 | " | — | — | — | " | " | (colored yellow) | | — | — |
| Ex. 3 | " | a | 0.0060 | 0.05 | " | " | 90 | 12 | 0 | 0 |
| CEx. 2 | " | a | 0.0060 | — | " | " | 90 | 15 | 0 | 11 |
| Ex. 4 | " | a | 0.0100 | 0.10 | " | " | 90 | 20 | 0 | 0 |
| CEx. 3 | " | a | 0.0100 | — | " | " | 90 | 21 | 0 | 15 |
| CEx. 4 | " | a | 0.5000 | — | " | " | 91 | 23 | 0 | 33 |
| Ex. 5 | " | a | 0.0080 | 0.08 | " | 0.0015 | 91 | 15 | 0 | 0 |
| CEx. 5 | " | a | 0.0080 | — | " | " | 91 | 17 | 0 | 14 |
| Ex. 6 | " | a | 0.0045 | — | " | 0.0016 | 91 | 10 | 0 | 0 |
| CEx. 6 | 14,900 | a | 0.0500 | — | 14,800 | 0.0016 | 90 | 15 | 0 | 19 |
| CEx. 7 | " | a | 0.0045 | — | " | 0.0130 | 87 | 36 | 0 | 45 |
| Ex. 7 | 17,100 | a | 0.0045 | — | 17,000 | 0.0017 | 90 | 17 | 0 | 0 |
| Ex. 8 | 14,900 | b | 0.0040 | — | 14,800 | 0.0016 | 91 | 9 | 0 | 0 |
| Ex. 9 | 17,100 | b | 0.0040 | — | 17,000 | 0.0015 | 90 | 20 | 0 | 0 |
| Ex. 10 | " | b | 0.0060 | 0.05 | " | " | 90 | 18 | 0 | 0 |
| CEx. 8 | " | b | 0.0060 | — | " | " | 90 | 19 | 0 | 12 |
| Ex. 11 | 14,900 | b | 0.0045 | — | 14,800 | 0.0014 | 90 | 13 | 0 | 0 |
| CEx. 9 | " | c | 0.0045 | — | " | " | 90 | 11 | 0 | 22 |

*a: triphenyl phosphine
b: diphenyl-1,4-dihydroxyphenyl-2-phosphine
c: triphenyl phosphite
**glyceryl monostearate

What is claimed is:

1. A polycarbonate resin composition comprising a blended mixture of
    (A) a polycarbonate resin having a viscosity average molecular weight of from about 13,000 to about 18,000,
    (B) 0.0001 to less than 0.02% by weight, based on the weight of the resin (A), of an organic phosphine, and
    (C) 0 to 0.5% by weight, based on the weight of the resin (A), of a partial ester of a monobasic fatty acid having 10 to 22 carbon atoms with a polyhydric alcohol having 2 to 10 carbon atoms,
the amount of the partial ester (C) being 0.01 to 0.5% by weight when the amount of the organic phosphine (B) is not less than 0.005% by weight, and said composition containing less than 0.004%, based on the weight of the resin (A), of chlorine.

2. The composition of claim 1 wherein the polycarbonate resin (A) is a polycarbonate resin derived from a bis(hydroxyphenyl)alkane and a carbonate precursor.

wherein $R^1$, $R^2$ and $R^3$, independently from each other, represent a $C_1$-$C_{20}$ alkyl, $C_3$-$C_6$ cycloalkyl or $C_2$-$C_6$ alkenyl group which may have a substituent such as hydroxy, acetoxy, lower alkylcarboxy, phenyl, or lower alkoxyphenyl, or a phenyl or naphthyl group which may have a substituent such as hydroxy or $C_1$-$C_{10}$ alkyl, and one of $R^1$, $R^2$ and $R^3$ may represent a hydrogen atom.

6. The composition of claim 1 wherein the partial ester (C) is a partial ester derived from at least one monobasic fatty acid having 10 to 22 carbon atoms selected from the group consisting of myristic acid, palmitic acid, stearic acid, oleic acid and fatty acids of hardened fish oils and at least one polyhydric alcohol having 2 to 10 carbon atoms selected from the group consisting of ethylene glycol, glycerol and pentaerythritol.

7. The composition of claim 1 which is in the form of a molded article for optical applications.

8. Use of the composition of claim 1 in a molded article for optical applications.

* * * * *